Figure 1:
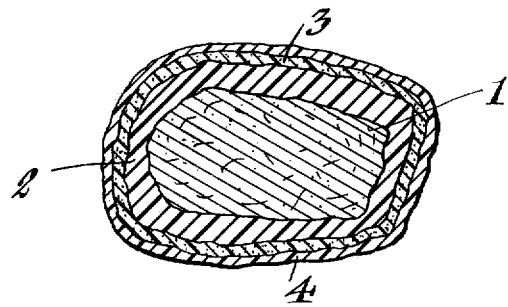

Inventors
KERNELL G. RIES
NORMAN P. ROBIE
PHYLLIS VON DOENHOFF
by W. G. Doley
Attorney Patented July 10, 1951

2,559,664

UNITED STATES PATENT OFFICE 2,559,664

RESIN BONDED ABRASIVE ARTICLE AND METHOD OF MANUFACTURING THE SAME

Kernell G. Ries, Niagara Falls, Norman P. Robie, Lewiston, and Phyllis von Doenhoff, Niagara Falls, N. Y., assignors to The Carborundum Company, Niagara Falls, N. Y., a corporation of Delaware Application February 11, 1947, Serial No. 727,932

12 Claims. (Cl. 51—298)

This invention relates to resin bonded abrasive articles and method of making the same. It is particularly concerned with making an abrasive article such as an abrasive wheel or stone wherein the abrasive grains are bonded with a heat-hardened synthetic resin containing isolated particles of a thermoplastic resin distributed through a matrix of the heat-hardened resin and to the product resulting from such method.

There are three classes of organic bonds which are employed in the abrasive industry for making abrasive wheels. They are heat-hardened synthetic resins, particularly phenolic resins, shellac, and vulcanized rubber including both natural rubber and the so-called "synthetic" rubbers. Each of these bonds has characteristics which make abrasive wheels which have been found to be particularly well suited for different purposes. For example, shellac wheels have been used in stone cutting, rubber bonded wheels have been used where finish is of primary importance, while heat-hardened resin bonds are known for their relatively high efficiency and cutting rate on severe grinding operations such as the snagging of steel castings. Heretofore the wheels made with the heat-hardened phenolic resins have not produced finishes at all comparable to those obtainable with either the rubber or the shellac bonded wheels.

In making abrasive wheels with a heat-hardenable resin bond it is customary to first wet the abrasive grains with a resin solvent such as a liquid resin or a high-boiling aldehyde such as furfural and mix the wetted grains with the powdered resin. The proportions of abrasive grains, wetting agent and powdered resin are adjusted to provide a mix wherein the resin is all attached to the abrasive grains and the individual grains are relatively dry to the touch. If there is any loose resin the product is not uniform and does not have the uniform ratio of bond to abrasive grain which was intended. The reason that such mixes are satisfactory is because the portion of the powdered resin which is in contact with the moistened surfaces of the grain is dissolved, at least partially, in the wetting agent and provides a sticky wet surface which picks up the remaining powdered resin. Where attempts are made to incorporate powders which are not soluble in the resin solvent they must be mixed with the powdered resin in order to get them uniformly distributed about the grains and through the mix. If they are not thus mixed with the powder and are simply added to the abrasive grains which have previously been coated with the solvent and the powdered resin they do not adhere properly and result in a mix which is described as "fuzzy" wherein the non-soluble component is very loosely attached. Such a mix is wholly unsatisfactory because the bond is not uniformly distributed through the article.

It is accordingly an object of the present invention to provide an abrasive wheel bonded primarily with a heat-hardened resin which will have the high efficiency and cutting rate characteristic of such articles but which will also develop surface finishes comparable to those obtainable by rubber and shellac bonded wheels. Another object of the invention is to provide a method of making such wheels. A third object of the invention is to provide a method for distributing a thermoplastic resin through a matrix of a heat-hardened resin in the bond of an abrasive wheel in such manner as to provide a wheel which will have a high cutting rate, a high efficiency and which will develop relatively smooth finishes. Another object of the invention is to provide a method for making a mix from abrasive grains, a heat-hardenable resin and a thermoplastic resin which will be uniform and satisfactorily moldable. Other objects of the invention will appear from the disclosure hereinafter made.

We have discovered a method of making abrasive mixes which are wholly satisfactory from the operating standpoint and which, when molded and heated to harden the resin, provide articles which have a high efficiency and cutting rate and provide finishes superior to those previously obtainable from abrasive wheels bonded with heat-hardened resins. Our invention provides a method of modifying a heat-hardened resin bond by distributing through it a thermoplastic resin component which modifies the characteristics of the heat-hardened resin and is presumed to be responsible for the improved results obtained with wheels made according to it. Examination of thin sections of such wheels shows that the abrasive grains are bonded by a primary bond or matrix of the heat-hardened resin which has distributed through it small particles of the thermoplastic component. The size of the particles of thermoplastic resin is much greater than the individual particles which are put into the original mix and the large particles are apparently formed by the fusing together of a number of such small particles which presumably occurs when the molded article is heated to harden the thermo-setting resin.

Figure 2:
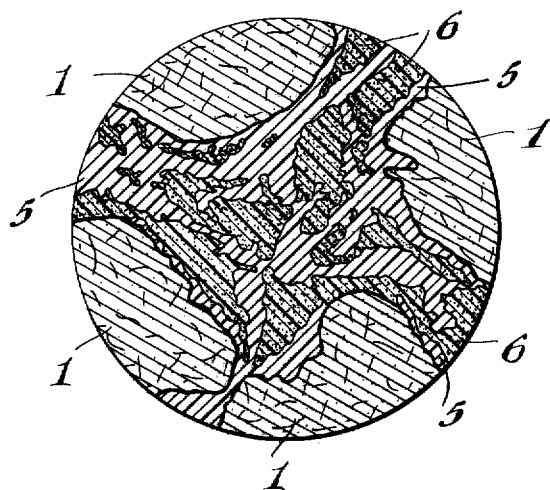

Understanding of our invention will be facilitated by reference to the accompanying drawings wherein:

Figure 1 is a section, greatly enlarged, of an abrasive grain provided with coatings of resin bond made in accordance with our invention; and Figure 2 is a reproduction of a section of a piece of a completed abrasive wheel made in accordance with our invention.

Referring to the drawings, in Figure 1 an abrasive grain 1 is enclosed within a coating 2 of the resin solution formed by first applying a resin solvent to the grain and then mixing with a pulverized heat-hardenable resin which is soluble in the solvent and allowing to stand until the powder is all soaked up by the liquid. Outside of the layer 2 is a layer 3 of a thermoplastic resin which is present in the form of finely divided particles and surrounding it is layer 4 of a powdered heat-hardenable resin.

In Figure 2 there are shown parts of four abrasive grains 1 with bond consisting of a heat-hardened resin 5 containing particles of thermoplastic resin 6 distributed through it.

The coated grains as shown in Figure 1 are prepared as follows:

The abrasive grains are first admixed with a small quantity of a liquid which is a solvent for the powdered heat-hardenable resin which is to be subsequently added but is not a solvent for the thermoplastic resin. A sufficient amount of the solvent is mixed with the grain to wet the surfaces of the grain sufficiently so that they will pick up the heat-hardenable resin which is to be applied and which, with the solvent, forms the coating 2 of Figure 1. The proportions of solvent and powdered resin are so chosen as to provide a loose mass of abrasive grains individually coated with the resin and solvent and in such condition that the grains feel dry to the touch because of the presence of the powdered resin on the outside.

The thus coated grains then admixed with an aqueous dispersion or synthetic latex of the thermoplastic resin and the grains so wet are then mixed with additional powdered heat-hardenable resin. The latex of the thermoplastic resin is not a solvent for the heat-hardenable resin, the outer layer of heat-hardenable resin being attached to the grains by a purely mechanical adhesion.

The grains are then spread into a relatively thin layer and dried to remove the moisture from the synthetic latex, preferably at a slightly elevated temperature as at 125–150° F. When the moisture of the latex has been entirely removed by the drying the resulting product is a loose dry mass of grains coated as shown in Figure 1. The resin on the grains is in such condition that the mixture cannot be cold pressed unless it is wet with a solvent because the bond is too dry and non-cohesive.

The coated grains are then molded, preferably under heat and pressure, and the article is additionally heated to cure the heat-hardenable resin and flux the thermoplastic resin to provide the bond structure illustrated in Figure 2. The heat-treatment may be performed on the article after it has been removed from the mold or it may be carried out with the article in the mold and with a weight applied to the plunger of the mold or with the mold clamped in accordance with practices well known in the abrasive art.

The following examples are illustrative but not limitative of specific methods of carrying out our invention.

*Example I*

75 parts by weight of 50 grit fused alumina grain were mixed with .6 part of furfural in a so-called "Hobart" mixer until the furfural had been uniformly spread over the abrasive grains. 9 parts of a mixture of equal parts of powdered cryolite and a powdered heat-hardenable phenol-formaldehyde resin in the "A" stage sold by the Bakelite Corporation under the designation "BR-2417" were added to the wetted grain in the mixer and mixing was continued until the powdered resin had been uniformly dispersed over the surfaces of the grains.

7 parts of an emulsion of polyvinyl acetate in water containing 63% solids and sold by E. I. du Pont de Nemours Co. under the designation "RH-460A" were then added to the mixer and agitation was continued until the emulsion had been distributed through the mix. Finally, 9 parts of a mixture of the powdered cryolite and powdered phenol resin referred to above were added and mixed in until the mix was uniform.

The mixture was then removed from the bowl of the mixer, spread into a layer about 1 inch thick and air dried at room temperature for 24 hours and then heated for 16 hours at a temperature of 110–120° F. This drying treatment removed the water which had been present in the emulsion.

A cut-off wheel 14 inches in diameter, ⅛ inch thick and having an arbor hole 1 inch in diameter (14″ x ⅛″ x 1″) was then pressed from the mix according to the following procedure. 940 grams of the mix was placed in a mold, leveled off and covered with a plunger and the assemblage was put into a press having a 10-inch ram and provided with platens heated to a temperature of 320° F. Pressure of 5500 pounds per square inch was then applied to the ram of the press and the mold was left in the press until powdered sulfur put on a side of the top plunger of the mold melted. The press platens were then cooled and the formed article was removed from the mold when it had been cooled to a temperature where it could be handled. It was then cured by heating for 1 hour at 200° F., 1 hour at 225° F., 1 hour at 250° F., 1 hour at 275° F., and 3 hours at 300° F. The heat was then cut off and the article cooled to 250° F. in 1 hour and to 100° F. at the rate of 25° F. per hour.

*Example II*

A wheel for grinding steel billets 16″ x 2½″ x 6″ was made as follows. A mixture of 74 parts by weight 12 grit, 37 parts 14 grit, and 37 parts 16 grit fused alumina abrasive grain was put into a mechanical mixer and mixed with 2.8 parts of a liquid heat-hardenable phenol-formaldehyde resin sold by the Bakelite Corporation under the designation "BR-7534." After the liquid resin had been distributed over the abrasive grains, 18.2 parts of the mixture of equal parts of powdered cryolite and "Bakelite" powdered resin of the previous example were added and mixing was continued until the powder had been distributed uniformly over the grains.

11.8 parts of an aqueous suspension containing 54% of a copolymer of 90 parts vinyl chloride and 10 parts vinylidene chloride sold by the B. F. Goodrich Company under the designation "Geon Latex 11X" were then put into the mixer and mixing was continued until the latex had been uniformly mixed into the resin coated grain.

Finally 19.2 parts of the mixture of equal parts of powdered cryolite and "BR-2417" were added, mixing being continued until the mixture was homogeneous. The mixture was removed from the mixer and dried as in Example I to remove the moisture.

24,320 grams of the dried mixture were then put into a stop mold having an inside diameter of 16⅜ inches and an arbor pin 5⅞ inches in diameter and the mixture was pressed to a density of 47 grams per cubic inch. The press used was provided with platens which were heated to 320° F. and pressure was applied to a 10-inch ram through two lines, the high pressure having a water pressure of 5500 pounds per square inch and the low pressure of 150 pounds per square inch. The mold with its contents was pressed under high pressure for a few seconds to compress. The high pressure was then removed and the low pressure was applied and held for 15 minutes. Thereafter the high pressure was again applied to close the mold to such a volume as to give the desired density and held for 1 hour. The heat was then cut off and the molded article was cooled under pressure and finally removed from the mold. It was cured in an oven according to the following cycle: 175° F. for 2 hours, 200° F. for 1 hour, 225° F. for 1 hour, 250° F. for 1 hour, 275° F. for 1 hour, 300° F. for 16 hours.

The oven was then cooled to 250° F. in one hour and to 100° F. at the rate of 25° F. per hour.

*Example III*

A so-called "coping" wheel for cutting stone was made as follows. A mixture was prepared in the manner described in the preceding examples from the following ingredients, which were added in the order listed below.

| | Parts by weight |
|---|---|
| 24 grit silicon carbide | 75 |
| Furfural | 1.1 |
| Mixture of 6.4 parts powdered resin and 2.6 parts powdered cryolite | 9 |
| "Geon Latex 11X" | 7 |
| Mixture of 6.4 parts powdered resin and 2.6 parts powdered cryolite | 9 |

A steel center wheel ⅚ inch thick and having an outside diameter of 16 inches and an inside diameter of the abrasive rim of 12 inches was formed on a steel plate provided with a 1¼ inch arbor hole, which was 3/32 inch thick and 13 inches in diameter. The wheel was formed by filling the mold approximately one-half full of the abrasive mix around the periphery, placing the steel center in the mold and then filling the mold with the mix to form the abrasive ring which overlapped the steel center by approximately ½ inch all the way around the periphery. The assemblage was hot pressed to a density of 35 grams to the cubic inch in a press the platens of which were heated to 320° F. The press had a 14-inch plunger and the high pressure of 5500 pounds per square inch was first applied for a few seconds to compress the mix. This pressure was then relieved and the low pressure was applied until sulfur on the side of the barrel melted, whereupon the mold and its contents were transferred to a cold press, pressed down to density, and allowed to cool. The wheel was cured for 2 hours at 175° F., 1 hour at 200° F., 1 hour at 225° F., 1 hour at 250° F., 1 hour at 275° F., and 4 hours at 300° F. It was then cooled to 250° F. in one hour and to 100° F. at the rate of 25° F. per hour.

As has been stated, abrasive articles made in accordance with our invention have a very unusual combination of properties. They have the cutting rate and efficiency characteristic of abrasives bonded with heat-hardened resins and they also are capable of developing the improved finishes heretofore obtainable only with rubber bonded or shellac bonded abrasives. While we do not wish to be bound by any theories, one explanation which has been suggested is that the thermoplastic resin softens when the abrasive grains become somewhat dulled, thereby weakening the bond structure and allowing the abrasive grains to break away and thus expose new and sharp grains for cutting. At the same time the thermoplastic component of the bond presumably behaves somewhat similarly to the heat-softenable hard rubber and shellac in giving a burnishing or polishing action, thus accounting for the improved finish obtained with these wheels.

It is also possible that the thermoplastic component of the bond yields somewhat when the article is cooled after the bond has been cured, thus relieving to some extent the strains which are presumed to be present in the bond of abrasives bonded with heat-hardened resins. The coefficient of expansion of the heat-hardened resins is considerably higher than that of abrasive grains and it has been supposed that when the abrasive wheel is cooled to room temperature from the temperature of about 300-400° F. at which the resin bonds are hardened this differential in coefficient of expansion causes stresses to be set up in the resin bond, thereby making the bond subject to shattering under the impacts encountered in use.

Regardless of the reason it has been found that in the articles made by our process the bond consists of a matrix of the heat-hardened resin in which is enclosed particles formed by the agglomeration of a considerable number of the original powdered thermoplastic particles distributed through it. It has also been found that greatly improved finishes are obtainable by these wheels without any sacrifice of the relatively high cutting rate and efficiency which are characteristic of abrasives bonded with heat-hardened resins.

Different types of heat-hardenable resins may be used. We have found the phenol aldehyde, amine aldehyde, and amine modified phenol aldehydes such as aniline modified phenol formaldehyde resins to be particularly well adapted for use in the invention.

We may also use a number of different thermoplastic resins. Among those which we have found to be well suited are acetals of polyvinyl alcohol and particularly the incompletely acetalized products such as the partial butyraldehyde or formaldehyde acetal of polyvinyl acetate; polyvinyl esters such as polyvinyl acetate, polyvinyl chloride and copolymers of vinyl chloride and vinyl acetate; copolymers of vinyl chloride and vinylidene chloride; and copolymers of vinyl compounds with esters of unsaturated acids such as a copolymer of vinyl chloride with an ester of maleic acid. We prefer to use thermoplastic resins which are insoluble in the solvents used and incompatible with the heat-hardenable resins so that the thermoplastic resins will not mix with the heat-hardened resin when the article is heated to cure the bond.

We have also found it important to employ thermoplastic resins of such softening point that the particles of the thermoplastic resin will flux and weld together into the agglomerates referred to when the article is heated to harden the heat-hardenable resin. If the softening point of the thermoplastic resin is too high the heat-hardenable resin becomes fluxed together and hardened before the thermoplastic resin softens sufficiently to form the agglomerates. On the other hand, if the softening point of the thermoplastic resin is too low that resin tends to flow too much. In such a case it separates and tends to flow to the bottom of the article rather than to remain distributed through the matrix of heat-hardened resin in the condition which we have found to be most satisfactory.

We have given specific examples of wheels made in accordance with our invention for use in grinding stainless steel billets and for cutting stone. Our invention is not limited to the production of abrasive wheels for these purposes but is applicable generally to the production of such wheels with heat-hardened resin bonds. For example, the invention makes improved wheels for cutting-off purposes and for snagging steel castings in addition to the two specific uses described in the examples.

As is illustrated by the examples, different resin solvents may be employed and fillers may be admixed, particularly with the heat-hardenable component of the bond, according to practices well known in the abrasive art. Similarly, the proportions of the liquid and powdered components may and should be varied depending upon the molding process which is to be employed. Other modifications common in the abrasive art may be practiced without departing from the spirit of the invention, the scope of which is defined in the appended claims.

We claim:

1. The method of making an abrasive article which comprises coating abrasive grains, in the order named, with a solvent for a heat-hardenable resin, a powdered heat-hardenable resin, an aqueous dispersion of a thermoplastic resin selected from the group consisting of polymers and copolymers of vinyl compounds, and finally with a second layer of the powdered heat-hardenable resin, drying the thus coated grains to remove substantially all of the water therefrom, forming an article from a mass of such resin coated abrasive grains, and heating the thus formed article at such temperatures and for such times as to heat-harden the heat-hardenable resin and cause the finely divided particles of thermoplastic resin to soften and aggregate into larger particles and become distributed through the mass of the heat-hardened resin.

2. The method of making an abrasive article which comprises coating abrasive grains, in the order named, with a solvent for a heat-hardenable resin, a powdered heat-hardenable resin, a synthetic latex of a thermoplastic resin selected from the group consisting of polymers and copolymers of vinyl compounds, and finally with a second layer of a heat-hardenable resin, drying the thus coated grains to remove substantially all of the water therefrom, forming an article from a mass of such resin coated abrasive grains under heat and pressure, and heating the thus formed article at such temperatures and for such times as to heat-harden the heat-hardenable resin and cause the finely divided particles of thermoplastic resin to soften and aggregate into larger particles and become distributed through the mass of the heat-hardened resin.

3. The method of making an abrasive article which comprises coating a mass of abrasive grains with a small quantity of a liquid which is a solvent for a powdered heat-hardenable synthetic resin; mixing the wetted grains with a sufficient amount of the said powdered resin to coat the grains and make them dry to the touch; mixing the thus coated grains with an aqueous suspension of a thermoplastic resin selected from the group consisting of polymers and copolymers of vinyl compounds, the said thermoplastic resin being insoluble in the solvent for the heat-hardenable resin, incompatible and non-reactive with the heat-hardenable resin and having a softening point high enough to prevent it from flowing through the heat-hardenable resin and low enough so that the resin is fluxed and a number of particles of the resin weld together and form aggregates during the heat treatment of the formed article; mixing the grains with an additional quantity of the said powdered resin; drying the mix to remove the water and obtain a loose, dry mass of grains individually coated with the resins; forming an article from the mixture under heat and pressure; removing the article from the mold; and additionally heating the formed article to flux the particles of the thermoplastic resin and to heat-harden the heat-hardenable resin whereby to form a bonded abrasive article in which the bond comprises a matrix of a heat-hardened synthetic resin having distributed through it small particles of a thermoplastic resin substantially all of which are in the form of aggregations of several finely divided particles of the resin of the original aqueous suspension.

4. Method as claimed in claim 3 wherein the powdered heat-hardenable resin is a phenol-formaldehyde condensation product.

5. Method as claimed in claim 4 wherein the thermoplastic resin is a copolymer of vinyl chloride and vinylidene chloride.

6. A resin bonded abrasive body such as an abrasive wheel or stone comprising a plurality of abrasive grains bonded into the said body by a bond comprising both a heat-hardening resin and a thermoplastic resin selected from the group consisting of polymers and copolymers of vinyl compounds, said thermoplastic resin being incompatible and non-reactive with the heat-hardenable resin and having a softening point high enough to prevent it from flowing through the heat-hardenable resin and low enough so that the particles of thermoplastic resin are fluxed and weld together to form aggregations during the heat-treatment of the formed article, said bond being so distributed that the abrasive grains are surrounded by a coating of the heat-hardened resin and the said thermoplastic resin is positioned between the said coating of heat-hardened resin surrounding the grains and a second layer of heat-hardened resin, the said thermoplastic resin being so distributed through the heat-hardened resin as to modify the characteristics of the heat-hardened resin and provide an abrasive article characterized by a high efficiency and cutting rate and the ability to impart superior finishes to the material being abraded.

7. An article as claimed in claim 6 wherein the heat-hardened resin is a phenol-formaldehyde condensation product.

8. An article as claimed in claim 7 wherein the thermoplastic resin is a copolymer of vinyl chloride and vinylidene chloride.

9. An article as claimed in claim 6 wherein the synthetic resin is an amine aldehyde resin.

10. An article as claimed in claim 6 wherein the thermoplastic resin is a copolymer of vinyl chloride and vinylidene chloride.

11. An article as claimed in claim 6 wherein the thermoplastic resin is a copolymer of vinyl chloride and vinyl acetate.

12. An article as claimed in claim 6 wherein the thermoplastic resin is a copolymer of a chlorinated vinyl compound with an ester of maleic acid.

KERNELL G. RIES.
   NORMAN P. ROBIE.
   PHYLLIS von DOENHOFF.

REFERENCES CITED

The following references are of record in the file of this patent:

UNITED STATES PATENTS

| Number | Name | Date |
| --- | --- | --- |
| 2,421,852 | Rogers et al. | June 10, 1947 |
| 2,416,182 | Kistler | Feb. 18, 1947 |
| 2,327,218 | Robie | Aug. 17, 1943 |
| 2,272,873 | Kistler | Feb. 10, 1942 |
| 2,246,898 | Sayre | June 24, 1941 |
| 2,111,006 | Robie | Mar. 15, 1938 |
| 1,993,821 | Benner et al. | Mar. 12, 1935 |
| 1,950,641 | Upper | Mar. 13, 1934 |
| 1,901,325 | Novotny | Mar. 14, 1933 |